US012236927B2

(12) United States Patent
Tomita

(10) Patent No.: US 12,236,927 B2
(45) Date of Patent: Feb. 25, 2025

(54) EFFECTS DEVICE AND EFFECTS PROCESSING METHOD

(71) Applicant: Roland Corporation, Shizuoka (JP)

(72) Inventor: Shinji Tomita, Shizuoka (JP)

(73) Assignee: Roland Corporation, Shizuoka (JP)

( * ) Notice: Subject to any disclaimer, the term of this patent is extended or adjusted under 35 U.S.C. 154(b) by 827 days.

(21) Appl. No.: 17/356,503

(22) Filed: Jun. 23, 2021

(65) Prior Publication Data

US 2021/0407482 A1 Dec. 30, 2021

(30) Foreign Application Priority Data

Jun. 26, 2020 (JP) ................................ 2020-110180

(51) Int. Cl.

| | |
|---|---|
| ***G10H 1/36*** | (2006.01) |
| ***G10H 1/00*** | (2006.01) |
| ***G10H 3/18*** | (2006.01) |

(52) U.S. Cl.
CPC ........... *G10H 1/366* (2013.01); *G10H 1/0025* (2013.01); *G10H 3/188* (2013.01); *G10H 2210/066* (2013.01)

(58) Field of Classification Search
CPC ...... G10H 1/366; G10H 1/0025; G10H 3/188; G10H 2210/066
USPC ........................................................... 84/610
See application file for complete search history.

(56) References Cited

U.S. PATENT DOCUMENTS

| | | | | |
|---|---|---|---|---|
| 6,399,868 B1 * | 6/2002 | Yamato | ................ | G10H 1/0091 84/707 |
| 2009/0229448 A1 * | 9/2009 | Yamada | ................. | G10H 3/186 84/612 |
| 2012/0189131 A1 * | 7/2012 | Ueno | ..................... | H03G 9/025 381/61 |
| 2012/0294457 A1 * | 11/2012 | Chapman | ................. | H04R 3/00 381/98 |

(Continued)

FOREIGN PATENT DOCUMENTS

| | | | |
|---|---|---|---|
| EP | 2362376 | 8/2011 | |
| EP | 2362376 A2 * | 8/2011 | ............... G10H 1/08 |

(Continued)

OTHER PUBLICATIONS

"Office Action of Europe Counterpart Application", issued on Oct. 11, 2023, pp. 1-6.

(Continued)

*Primary Examiner* — Christina M Schreiber
(74) *Attorney, Agent, or Firm* — JCIPRNET

(57) ABSTRACT

An input musical sound signal is input to band pass filters, and pass musical sound signals for each sound pitch are acquired. Total level ratios based on a total of levels of a sound pitch lower than those of the pass musical sound signals are calculated from the levels that are levels of the pass musical sound signals, and output coefficients are acquired on the basis of the total level ratios. Levels of octave musical sound signals acquired by converting the pass musical sound signals into sound pitches lower than those of the pass musical sound signals by one octave are multiplied by the output coefficients. In accordance with this, the octave musical sound signals of a low sound pitch can be extracted from among the octave musical sound signals.

18 Claims, 10 Drawing Sheets

(56) References Cited

U.S. PATENT DOCUMENTS

| | | | | |
|---|---|---|---|---|
| 2012/0294459 | A1* | 11/2012 | Chapman | G10H 3/186 381/98 |
| 2013/0104726 | A1* | 5/2013 | Fukuda | G10H 3/186 84/622 |
| 2013/0182862 | A1* | 7/2013 | Disch | G10H 1/08 381/61 |
| 2013/0216053 | A1* | 8/2013 | Disch | H03G 5/00 381/61 |
| 2021/0407482 | A1* | 12/2021 | Tomita | G10H 3/125 |
| 2023/0007394 | A1* | 1/2023 | Granger | H03G 9/18 |

FOREIGN PATENT DOCUMENTS

| | | | | | |
|---|---|---|---|---|---|
| JP | H06149262 | A | * | 5/1994 | |
| JP | H09185392 | A | * | 7/1997 | |
| JP | 2003122361 | A | * | 4/2003 | |
| JP | 2003208173 | | | 7/2003 | |
| JP | 2003208173 | A | * | 7/2003 | |
| JP | 2005037760 | | | 2/2005 | |
| JP | 2005037760 | A | * | 2/2005 | |
| JP | 2009216982 | A | * | 9/2009 | G10H 1/14 |
| JP | 2009244650 | A | * | 10/2009 | |

OTHER PUBLICATIONS

"Search Report of Europe Counterpart Application", issued on Nov. 26, 2021, p. 1-p. 10.

* cited by examiner

EFFECTS DEVICE AND EFFECTS PROCESSING METHOD

CROSS-REFERENCE TO RELATED APPLICATION

This application claims the priority benefit of Japan application serial No. 2020-110180, filed on Jun. 26, 2020. The entirety of the above-mentioned patent application is hereby incorporated by reference herein and made a part of this specification.

BACKGROUND

Technical Field

The disclosure relates to an effects device and an effects processing method.

Description of Related Art

In Patent Document 1, an effects device that converts an input musical sound signal into a musical sound signal having a sound pitch that is lower than that of the input musical sound signal by one octave, adds the converted musical sound signal to the input musical sound signal, and outputs a resultant musical sound signal has been disclosed. By only inputting a musical sound signal having one sound pitch to such an effects device, a performer can easily output sounds having two sound pitches, which have a one-octave interval therebetween, using a musical sound signal having a sound pitch lower than the input musical sound signal by one octave and the input original musical sound signal.

Patent Documents

[Patent Document 1] Japanese Patent Laid-Open No. 2005-37760 (for example, paragraphs 0020 to 0023, FIG. 2)

When musical sound signals according to a chord are input to the effects device disclosed in Patent Document 1, each sound composing the chord is converted into a musical sound signal having a sound pitch lower than that of the sound by one octave. Here, in the effects device disclosed in Patent Document 1, input musical sound signals are uniformly converted into musical sound signals having sound pitches that are lower than those of the input musical sound signals by one octave without being dependent on the sound pitches of sounds included in the input musical sound signals.

Thus, a sound pitch of a low sound in a chord according to musical sound signals of which sound pitches are lowered by one octave does not overlap with any of a chord according to input musical sound signals, and a sound pitch of a high sound in a chord according to musical sound signals of which sound pitches are lowered by one octave may overlap with some of the chord according to the input musical sound signals. In such a case, when the input musical sound signals and the musical sound signals of which the sound pitches are lowered by one octave are added together, sounds of two kinds having the same sound pitch are mixed, and there is a problem in that the sounds of the sound pitches are blurred.

SUMMARY

According to an embodiment of the disclosure, there is provided an effects device including: an input unit configured to input a musical sound signal; a level detecting unit configured to detect a level of the musical sound signal input by the input unit for each of multiple frequency bands; an extraction unit configured to extract a frequency characteristic of the musical sound signal based on the level of the musical sound signal detected by the level detecting unit; and an adding unit configured to add a predetermined sound effect to a lowest frequency band of the musical sound signal based on the frequency characteristic of the musical sound signal extracted by the extraction unit.

According to an embodiment of the disclosure, there is provided an effects processing method including: inputting a musical sound signal of a guitar; detecting a frequency characteristic of the musical sound signal of the guitar; conducting an octave processing, for frequency band corresponding to a lowest string among a plurality of strings of the guitar, to the musical sound signal of the guitar, based on the detecting of the frequency characteristic.

According an embodiment of the disclosure, there is provided an effects processing method including: inputting a musical sound signal; detecting a level of the musical sound signal input in the inputting of a musical sound signal for each of multiple frequency bands; extracting a frequency characteristic of the musical sound signal based on the level of the musical sound signal detected in the detecting of a level of the musical sound signal; and adding a predetermined sound effect to a lowest frequency band of the musical signal based on the frequency characteristic extracted in the extracting of a musical sound signal.

DESCRIPTION OF THE EMBODIMENTS

According to an embodiment of the disclosure, the disclosure provides an effects device and an effects processing method capable of extracting a musical sound signal according to a low sound in input musical sound signals and adding a predetermined sound effect thereto.

Figure 1A:
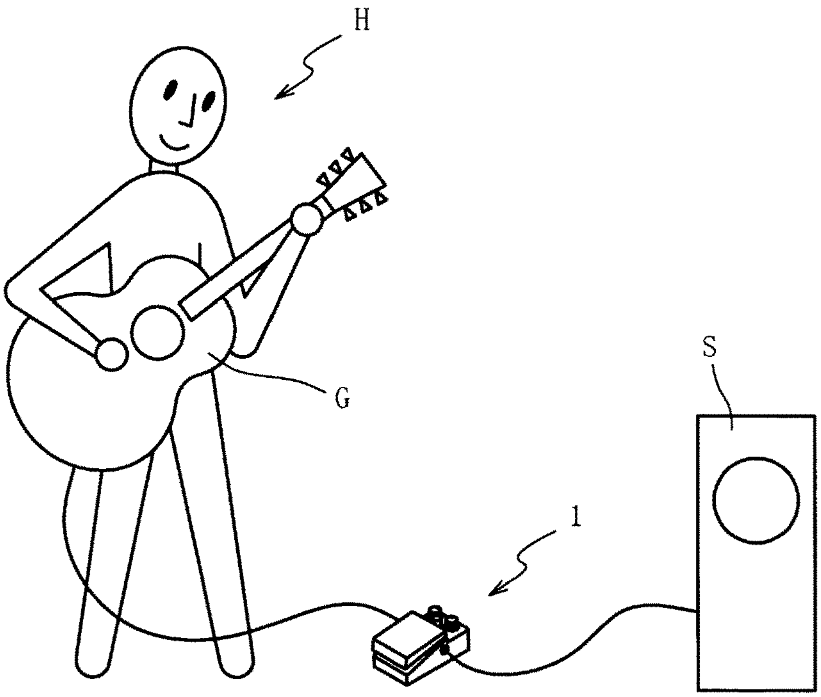
FIG. 1(*a*) is a diagram illustrating a use form of an effects device, and FIG. 1(*b*) is a top view of the effects device.
Figure 1B:
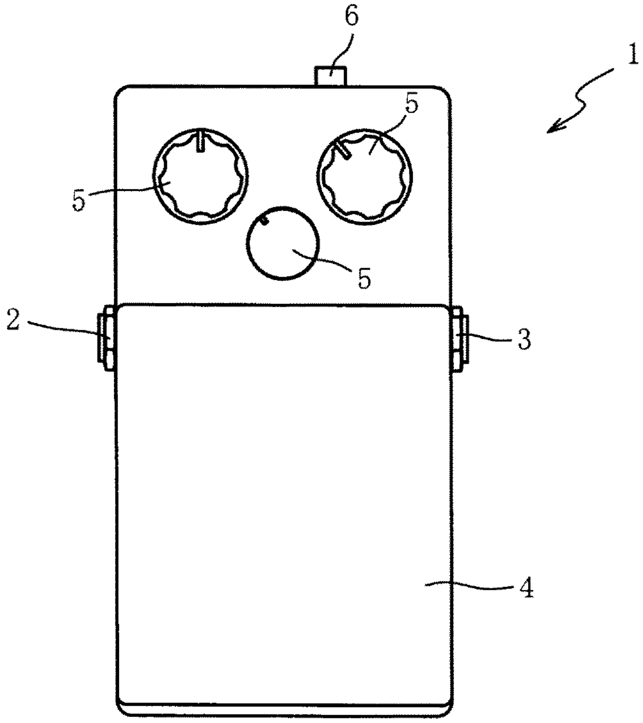

Hereinafter, a preferred embodiment will be described with reference to the attached drawings. An overview of an effects device 1 according to this embodiment will be described with reference to FIG. 1. FIG. 1(*a*) is a diagram illustrating a use form of the effects device 1, and FIG. 1(*b*) is a top view of the effects device 1. The effects device 1 is a device (effector) that outputs a musical sound signal Sout (see FIG. 4) that is a musical sound signal acquired by adding a musical sound signal Sin (see FIG. 4) input from an electric musical instrument such as an electric guitar G or a bass guitar and a musical sound signal to which a musical sound effect for reducing the sound pitch of the input musical sound signal Sin by one octave is added. Hereinafter, adding a sound effect for reducing the musical sound signal Sin by one octave will be referred to as "octave processing".

An input terminal 2 to which electric musical instruments such as an electric guitar G and a bass guitar are connected and a musical sound signal Sin is input from such an electric musical instrument, an output terminal 3 from which a musical sound signal Sout acquired by performing octave processing on the musical sound signal Sin input from the input terminal 2 is output, a pedal switch 4, an operator 5 in which an output level and the like of the musical sound signal Sout output from the output terminal 3 are set, and a changeover switch 6 for selecting a kind of an electric musical instrument connected to the input terminal 2 are disposed in the effects device 1.

The pedal switch 4 is a switch used for switching between addition/no-addition of a sound effect to the musical sound signal Sin input from the input terminal 2. In a case in which the pedal switch 4 is pushed in by the performer H stepping thereon with his or her foot or the like, octave processing is performed on the musical sound signal Sin. On the other hand, in a case in which the pushing-in on the pedal switch 4 is released by the performer H separating the foot from the pedal switch 4 or the like, performing of the octave processing on the musical sound signal Sin stops.

In the effects device 1 according to this embodiment, octave processing is performed on a musical sound signal having each sound pitch in the input musical sound signal Sin, and among musical sound signals on which the octave processing has been performed, an output level of a musical sound signal having a low sound pitch is set to be high, and an output level of a musical sound signal having a high sound pitch is set to be low. In accordance with this, a musical sound signal having a low sound pitch is extracted among musical sound signals on which octave processing has been performed, the extracted musical sound signal and the input musical sound signal Sin are added together, and a resultant signal is output as a musical sound signal Sout. The output musical sound signal Sout is output to a speaker S and is output (emitted) as a musical sound and is additionally output for other effects processing that performs other sound processing such as delaying.

At this time, in a case in which musical sound signals Sin according to a chord are input to the input terminal 2 in accordance with playing a chord on an electric guitar G and the like, sound musical signals Sin according to the input chord and a musical sound signal acquired by performing octave processing on a musical sound signal corresponding to a low sound pitch in the musical sound signals Sin are added together and output. Thus, sounds having the same sound pitch being included in a sound according to the musical sound signal on which the octave processing has been performed and a chord according to the input musical sound signal Sin can be inhibited.

In accordance with this, a musical sound according to the musical sound signal Sout output from the output terminal 3 can be configured to be a sound in which a chord according to the musical sound signals Sin input to the input terminal 2 and a chord according to musical sound signals acquired by performing octave processing on the musical sound signals Sin are added together (mixed), and blurring and distortion are suppressed.

Figure 2:
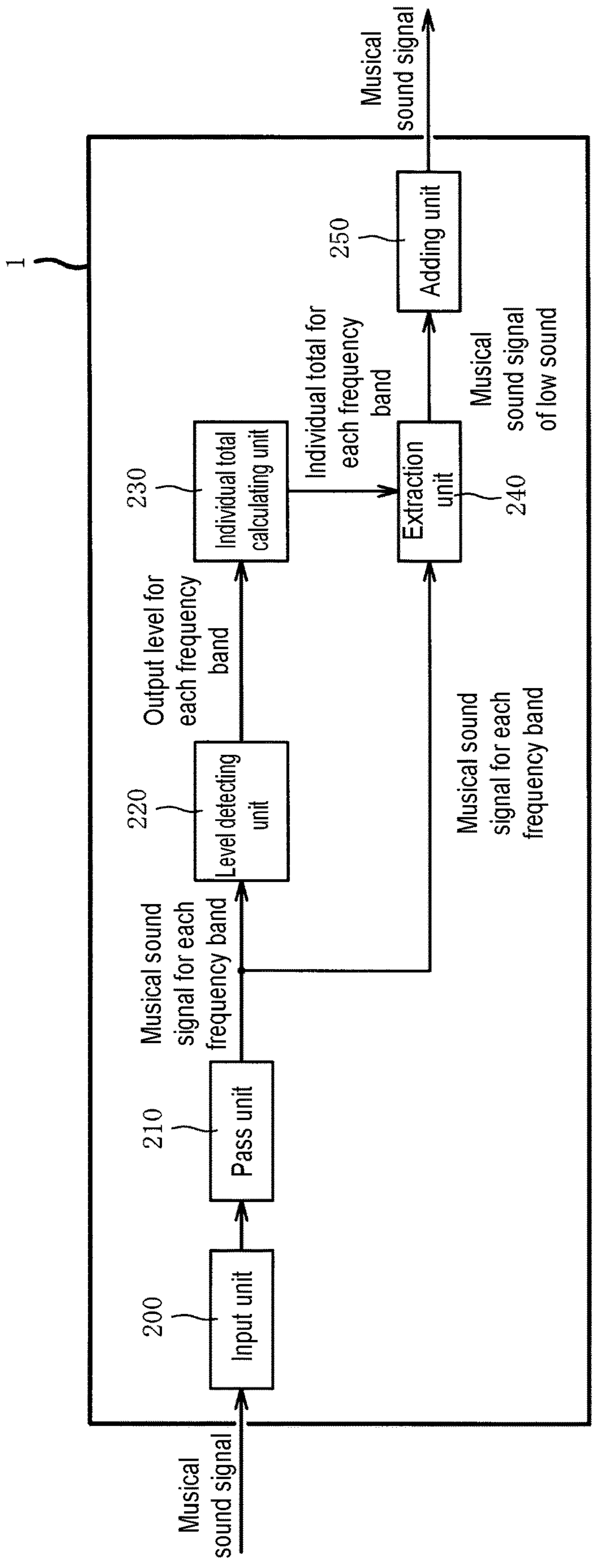
FIG. 2 is a functional block diagram of the effects device.

Next, the function of the effects device 1 will be described with reference to FIG. 2. FIG. 2 is a functional block diagram of the effects device 1. As illustrated in FIG. 2, the effects device 1 includes an input unit 200, a pass unit 210, a level detecting unit 220, an individual total calculating unit 230, an extraction unit 240, and an adding unit 250.

Figure 3:
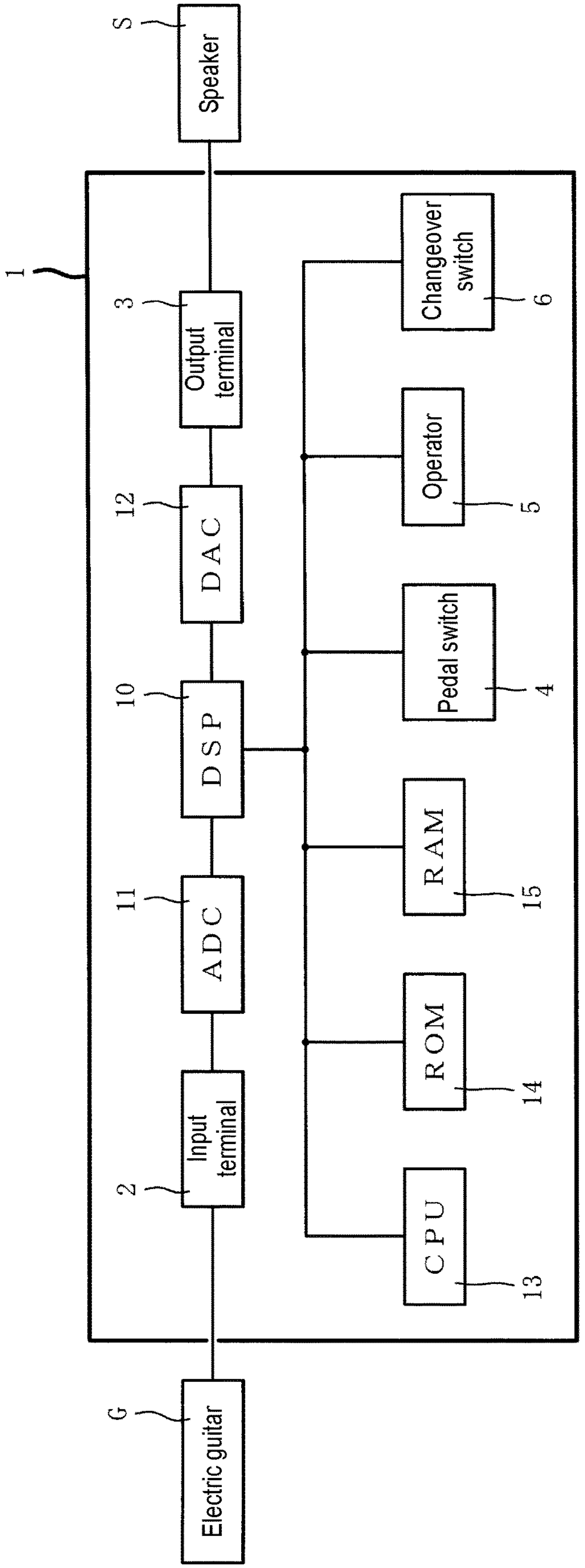
FIG. 3 is a block diagram illustrating an electrical configuration of the effects device.

The input unit 200 is a part that inputs a musical sound signal and is realized by an input terminal 2 and an ADC 11 to be described below with reference to FIG. 3. The pass unit 210 is a part that passes a musical sound signal input by the input unit 200 for each predetermined frequency band and is realized by a DSP 10 to be described below with reference to FIGS. 3 and 4. The level detecting unit 220 is a part that detects an output level of a musical sound signal for each frequency band that has been passed by the pass unit 210 and is realized by a DSP 10. The individual total calculating unit 230 is a part that, for each frequency band passed by the pass unit 210, calculates an individual total that is a total of output levels of frequency bands lower than the frequency band and is realized by a DSP 10.

The extraction unit 240 is a part that extracts a musical sound signal of a low sound in musical sound signals input by the input unit 200 by extracting a musical sound signal corresponding to a frequency band, for which an individual total is smaller than a predetermined value among individual totals for each frequency band calculated by the individual total calculating unit 230, from among musical sound signals for each frequency band passed by the pass unit 210 and is realized by a DSP 10. The adding unit 250 is a part that adds a predetermined sound effect to the musical sound signal extracted by the extraction unit 240 and outputs a resultant signal and is realized by a DSP 10.

In the effects device 1, an output level of the musical sound signal input by the input unit 200 for each predetermined frequency band is detected, and for each frequency band, an individual total that is a total of output levels of frequency bands lower than the frequency band is calculated. A musical sound signal corresponding to a frequency band, for which an individual total is smaller than a predetermined value among individual totals for such a frequency band, is extracted, a predetermined sound effect is added to the extracted musical sound signal, and a resultant signal is output. In this way, a musical sound signal according to a low sound can be extracted from the musical sound signal input by the input unit 200, and a predetermined sound effect can be added to the extracted musical sound signal.

Next, an electrical configuration of the effects device 1 will be described with reference to FIG. 3. FIG. 3 is a block diagram illustrating the electrical configuration of the effects device. In the effects device 1, a digital signal processor 10 (hereinafter, referred to as "DSP 10") that performs various processing relating to musical sound signals is disposed. In the DSP 10, a ROM storing a program not illustrated in the drawing and a RAM temporarily storing the program are disposed.

An analog digital converter (ADC) 11, a digital analog converter (DAC) 12, a CPU 13, a ROM 14, a RAM 15 and the pedal switch 4, the operator 5, and the changeover switch 6 described above are connected to the DSP 10.

The ADC 11 is a device that is connected to the input terminal 2 described above and converts a musical sound signal Sin that is an electric signal (an analog signal) input from an electric musical instrument such as an electric guitar G through the input terminal 2 into a digital signal (for example, 16 bits). The musical sound signal Sin converted by the ADC 11 is input to the DSP 10. The DAC 12 is a device that is connected to the output terminal 3 described above and converts a musical sound signal Sout output from the DSP 10 into an electric signal (an analog signal). The musical sound signal Sout converted into the electric signal by the ADC 11 is output to a speaker S and other effects devices through the output terminal 3.

The CPU 13 is an arithmetic calculation device that controls each of connected parts. The ROM 14 is a non-rewritable nonvolatile storage device that stores a program executed by the CPU 20, fixed-value data, and the like, and the RAM 15 is a memory that stores various kinds of work data, flags, and the like in a rewritable manner when the CPU 13 executes a program.

Figure 4:
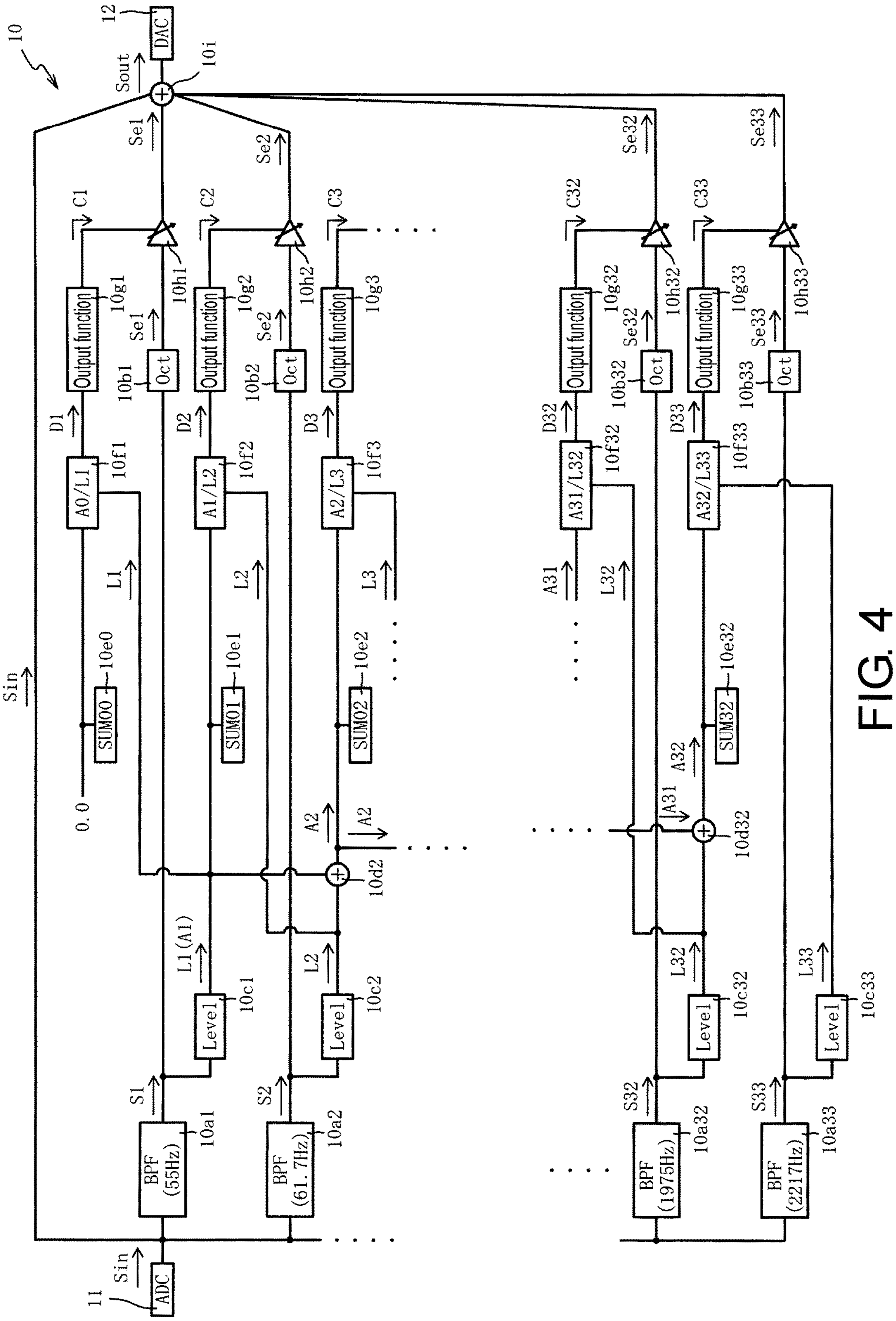
FIG. 4 is a functional block diagram of a DSP.

Next, the process of the DSP 10 will be described with reference to FIGS. 4 to 6. FIG. 4 is a functional block diagram of the DSP 10. A musical sound signal Sin input from the ADC 11 to the DSP is input to band pass filters (BPF) 10*a*1 to 10*a*33. The BPFs 10*a*1 to 10*a*33 are filters that pass musical sound signals of predetermined frequency bands. Hereinafter, musical sound signals that have passed through the BPFs 10*a*1 to 10*a*33 will be respectively referred to as "pass musical sound signals S1 to S33".

According to this embodiment, in the BPF 10*a*1, the center frequency is set to 55 Hz (A1), and a frequency band corresponding to frequencies that are respectively one semitone before the center frequency and one semitone after the center frequency, in other words, 51.9 Hz (G#1) to 58.3 Hz (A#1) is set as a pass band. In accordance with this, a musical sound signal of a frequency band of 51.9 Hz (G#1) to 58.3 Hz (A#1) among musical sound signals input from the ADC 11 is output as a pass musical sound signal S1 by the BPF 10*a*1.

Similarly, in the BPF 10*a*2, the center frequency is set to 61.7 Hz (B1), and a frequency band corresponding to frequencies that are respectively one semitone before the center frequency and one semitone after the center frequency (in other words, 58.3 Hz (A#1) to 65.4 Hz (C2)) is set as a pass band. In addition, in the BPF 10*a*32, the center frequency is set to 1975 Hz (B6), and a frequency band corresponding to frequencies that are respectively one semitone before the center frequency and one semitone after the center frequency (in other words, 1864.7 Hz (A#6) to 2093 Hz (C7)) is set as a pass band. In the BPF 10*a*33, the center frequency is set to 2217 Hz (C#7), and a frequency band corresponding to frequencies that are respectively one semitone before the center frequency and one semitone after the center frequency (in other words, 2093 Hz (C7) to 2349.3 Hz (D7)) is set as a pass band.

In other words, the pass bands according to the BPFs 10*a*1 to 10*a*33 are set such that there is no break (valley) between 58.3 Hz (A#1) to 2349.3 Hz (D7). In accordance with this, not only in a case in which the musical sound signal Sin input from the ADC 11 is composed of only sounds of a predetermined sound pitch but also in a case in which the musical sound signal Sin is composed of intermediate sounds between a sound pitch and another sound pitch by performing a choking play using an electric guitar G or the like, such sounds can be included in pass musical sound signals S1 to S33 according to the BPFs 10*a*1 to 10*a*33. On the basis of such pass musical sound signals S1 to S33, sounds lowered by one octave are output by octave processing parts 10*b*1 to 10*b*33 to be described below, and thus, the musical sound signal Sin can be converted into sounds lowered by one octave without disrupting musical balance.

The center frequencies of the BPFs 10*a*1 to 10*a*33 are not limited to the frequencies of the sound pitches described above, and other frequencies may be used. In addition, the pass band is not limited to the frequency band corresponding to frequencies that are respectively one semitone before the center frequency and one semitone after the center frequency but may be a frequency band corresponding to frequencies that are respectively more than one semitone after the center frequency and more than one semitone before the center frequency or may be a frequency band corresponding to frequencies that are respectively less than one semitone before the center frequency and less than one semitone after the center frequency.

The pass musical sound signals S1 to S33 are respectively input to the octave (Oct) processing parts 10*b*1 to 10*b*33. Each of the octave processing parts 10*b*1 to 10*b*33 converts an input musical sound signal into a musical sound signal having a sound pitch lower than the input musical sound signal by one octave. By being input to the octave processing parts 10*b*1 to 10*b*33, the pass musical sound signals S1 to S33 are respectively converted into octave musical sound signals Se1 to Se33 that are musical sound signals having sound pitches lower than the pass musical sound signals by one octave and are output.

In this embodiment, by adding the musical sound signal Sin input from the ADC 11 and the octave musical sound signals Se1 to Se33 using an adder 10*i* to be described below, a musical sound signal Sout is generated. At this time, by adjusting output levels of the octave musical sound signals Se1 to Se33 in accordance with output levels of the pass musical sound signals S1 to S33 that serve as the origins thereof, a musical sound signal having a low sound pitch among the octave musical sound signals Se1 to Se33 is extracted and is input to the adder 10*i*. Next, the adjustment of output levels of such octave musical sound signals Se1 to Se33 will be described.

The pass musical sound signals S1 to S33 are input also to level detecting parts 10*c*1 to 10*c*33 together with the octave processing parts 10*b*1 to 10*b*33. The level detecting parts 10*c*1 to 10*c*33 respectively detect levels L1 to L33 that are output levels of input pass musical sound signals S1 to S33.

Individual totals A1 to A32 are respectively calculated by individual total calculating parts 10*e*1 to 10*e*32 from the levels L1 to L32 detected by the level detecting parts 10*c*1 to 10*c*32. The individual totals A1 to A32 are totals of the levels L1 to L32 of frequency bands (in other words, sound pitches) lower than the corresponding pass musical sound signals S1 to S32.

More specifically, a method for acquiring the individual totals A1 to A32 will be described. First, the pass musical sound signal S1 is a musical sound signal having a lowest sound pitch, and thus, a level L1 detected by the level detecting part 10*c*1 is directly acquired as a corresponding individual total A1. The individual total A2 corresponding to the pass musical sound signal S2 is a value acquired by adding the level L1 and the level L2 and thus is set to a value acquired by adding the level L1 and the level L2 using the adder 10*d*2.

The individual total A3 corresponding to the pass musical sound signal S3 is a value acquired by adding the levels L1, L2, and L3 and thus is set to a value acquired by adding the value acquired by adding the level L1 and the level L2 using the adder 10*d*2 (in other words, the individual total A2) and the level L3 using the adder 10*d*3. Similarly, the individual totals A4 to A32 corresponding to the pass musical sound signals S4 to S33 are calculated. These individual totals A1 to A32 are respectively acquired by the individual total calculating parts 10*e*1 to 10*e*32.

In this embodiment, in addition to the individual totals A1 to A32, an individual total A0 according to an output level "0.0" (in other words, the value of the individual total A0 is "0.0") is acquired by the individual total calculating part 10*e*0. The reason for this is that the adjustment of the output levels of the octave musical sound signals Se1 to Se33 using multipliers 10*h*1 to 10*h*33 to be described below is performed on the basis of individual totals of output levels lower than respective frequency bands. Here, in the octave musical sound signals Se2 to Se33, levels L1 to L32 lower than respective frequency bands are present, and thus, the individual totals A1 to A32 can be acquired. However, in the octave musical sound signal Se1, the octave musical sound signal Se1 has a lowest sound pitch, and thus an output level of a frequency band lower than that is not present, and an individual total cannot be acquired. Thus, in this embodiment, the individual total A0 according to the output level "0.0" is acquired by the individual total calculating part 10*e*0, and the individual total A0 is used for the adjustment of the output level of the octave musical sound signal Se1.

These individual totals A0 to A32 and the levels L1 to L33 detected by the level detecting parts 10*c*1 to 10*c*33 are respectively input to the total level ratio calculating parts 10*f*1 to 10*f*33. The total level ratio calculating parts 10*f*1 to 10*f*33 calculate total level ratios D1 to D33 that are acquired by dividing the individual totals A0 to A32 by the levels L1 to L33. In other words, the total level ratio D1 acquired by dividing the individual total A0 by the level L1 is calculated by the total level ratio calculating part 10*f*1. Similarly, the total level ratio D2 acquired by dividing the individual total A1 by the level L2 is calculated by the total level ratio calculating part 10*f*2, the total level ratio D32 acquired by dividing the individual total A31 by the level L32 is calculated by the total level ratio calculating part 10*f*32, and the total level ratio D33 acquired by dividing the individual total A32 by the level L33 is calculated by the total level ratio calculating part 10*f*33.

The total level ratios D1 to D33 are values acquired by dividing the individual totals A0 to A32 having sound pitches lower than a corresponding sound pitch by the levels L1 to L33 of the corresponding sound pitches. Thus, when the values thereof become smaller, the sound pitches are regarded as being lower among sound pitches included in the musical sound signal Sin input from the ADC 11. On the other hand, when the values of the total level ratio D1 to D33 become smaller, the sound pitches thereof are regarded as being higher.

In addition, the total level ratios D1 to D33 are based on the individual totals A0 to A32 and the levels L1 to L33 of sound pitches lower than corresponding sound pitches and thus are not dependent on the levels L1 to L33 and the individual totals A0 to A32 of sound pitches higher than the corresponding sound pitches. For example, in a state in which only the 6th string is played in the electric guitar G, the total level ratios D1 to D33 corresponding to the sound of the 6th string are lower than those of the sounds of the 1st to 5th strings. In this state, in a case in which the 1st sting of which the sound pitch is higher than that of the 6-th sting is played with the same levels L1 to L33 as those of the 6-th string, the total level ratios D1 to D33 corresponding to the sound of the 6th string do not change with being dependent on the levels L1 to L33 and the individual totals A0 to A32 of the sound of the 1st string that has been newly played.

In addition, the levels L1 to L33 corresponding to the sound of the 1st string are the same as those of the sound of the 6th string, and the levels L1 to L33 corresponding to the sound of the 6th string that is being played are added to the individual totals A0 to A32 corresponding to the sound of the 1st string, and thus, the individual totals become larger than the individual totals A0 to A32 corresponding to the sound of the 6th string. In accordance with this, the total level ratios D1 to D33 corresponding to the sound of the 1st string are maintained to be higher than those of the sound of the 6th string. At this time, the total level ratios D1 to D33 corresponding to the 2th string to the 5th string that are not being played do not change with being dependent on the sound of the first string, and thus, these are also maintained to be higher than the total level ratios D1 to D33 corresponding to the sound of the 6th string. Thus, the total level ratios D1 to D33 corresponding to the sound of the 6th sting that is the lowest among sounds that are being spoken are smaller than those of the other sounds. Thus, also in a case in which, during a low sound is being spoken, a sound higher than that is spoken, a magnitude relation state of the total level ratios D1 to D33 can match the sound pitch state of a sound that is actually spoken.

In accordance with this, by comparing the magnitude relation of the total level ratios D1 to D33, a sound of a low sound pitch can be accurately identified among pass musical sound signals S1 to S33 included in an input musical sound signal Sin.

The total level ratios D1 to D33 calculated by the total level ratio calculating parts 10*f*1 to 10*f*33 in this way are respectively input to output functions 10*g*1 to 10*g*33. The output functions 10*g*1 to 10*g*33 output output coefficients that are coefficient for adjustment of output levels of musical sound signals in accordance with the input total level ratios D1 to D33. Hereinafter, an output coefficient output from the output function 10*g*1 will be referred to as an output coefficient C1, and output coefficients output from the output functions 10*g*2 to 10*g*33 will be respectively referred to as output coefficients C2 to C33.

By multiplying the output levels of the octave musical sound signals Se1 to Se33 respectively by the output coefficients C1 to C33 output from the output functions 10*g*1 to 10*g*33, the output levels of the octave musical sound signals Se1 to Se33 are adjusted. Here, the output coefficients C1 to C33 output from the output functions 10*g*1 to 10*g*33 will be described with reference to FIG. 5.

Figure 5:
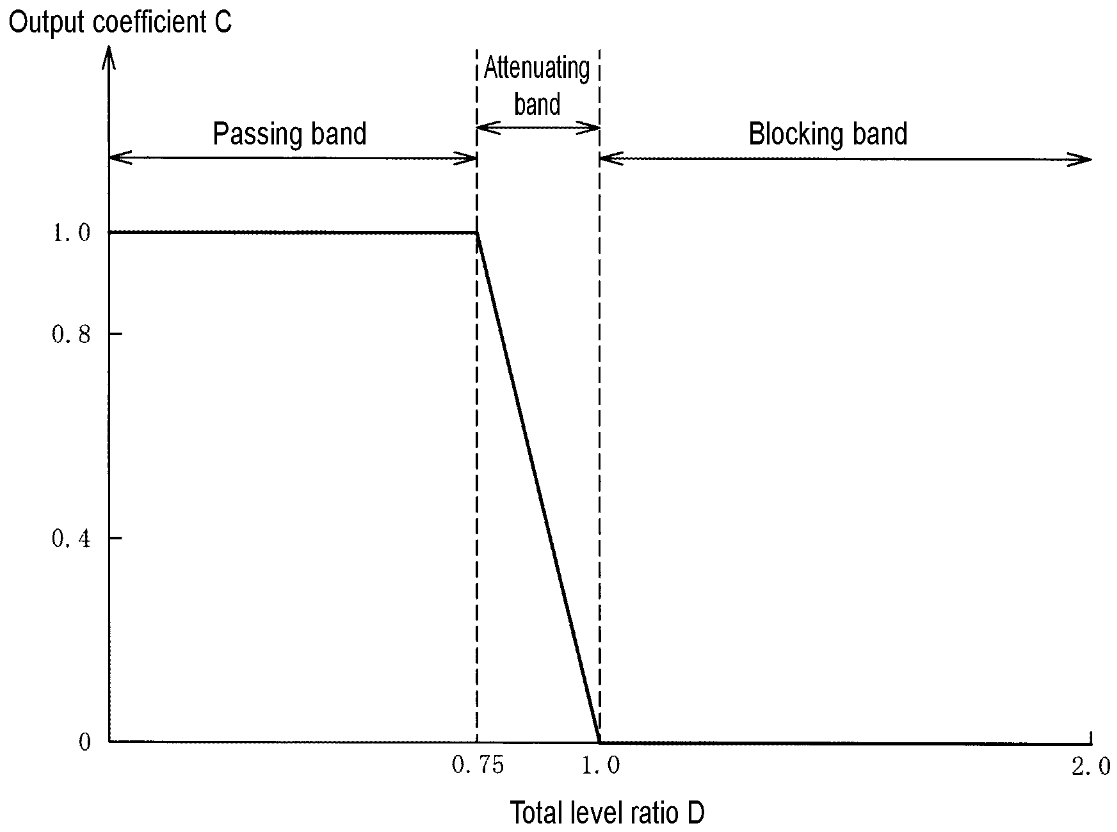
FIG. 5 is a graph representing a relation between a total level ratio and an output coefficient.

FIG. 5 is a graph representing a relation between a total level ratio D and an output coefficient C. In FIG. 5, the total level ratios D1 to D33 will be referred to as "total level ratio D" altogether, and the output coefficients C1 to C33 will be referred to as "output coefficient C" altogether. In this embodiment, as the output coefficient C, as illustrated in FIG. 5, "1.0" is set to the output coefficient C in a case in which the total level ratio D is between "0" and "0.75". In accordance with this, in a case in which the total level ratio D is in such a range, corresponding octave musical sound signals Se1 to Se33 are output to an adder 10*i* illustrated in FIG. 4 with the output levels of the octave musical sound signals Se1 to Se33 being maintained. The range of the total level ratio D in which the output coefficient C is set to "1.0" in this way will be referred to as a "passing band".

In a case in which the total level ratio D is between 0.75 and 1.0, the output coefficient C decreases from 1.0 to 0 in accordance with the magnitude of the total level ratio D. In accordance with this, in a case in which the total level ratio D corresponds to such a range, the output levels of the corresponding octave musical sound signals Se1 to Se33 decrease in accordance with the magnitude of the total level ratio D, and the octave musical sound signals Se1 to Se33 are output to the adder 10*i*. A range of the total level ratio in which such an output coefficient C is acquired will be referred to as an "attenuating band".

In a case in which the total level ratio D is higher than 1.0, “0” is set to the output coefficient C. In accordance with this, in a case in which the total level ratio D corresponds to such a range, the output level of the musical sound signal is set to “0”, and corresponding octave musical sound signals Se1 to Se33 are not output to the adder 10*i*. A range of the total level ratio in which the output coefficient C is set to “0.0” in this way will be referred to as a “blocking band”.

A case in which the total level ratio D is 0.0 to 1.0 corresponding to the passing band and the attenuating band is a case in which corresponding individual totals A0 to A32 are less than output levels corresponding to one tone of the corresponding levels L1 to L33, and a sound of a low sound pitch is not sufficiently extracted among the octave musical sound signals Se1 to Se33 of a sound pitch lower than that. In such a case, by outputting the output levels of the corresponding octave musical sound signals Se1 to Se33 to the adder 10*i* as it is or in an attenuated state, a sound of a low sound pitch can be extracted among the octave musical sound signals Se1 to Se33.

In addition, an attenuating band in which the total level ratio D is between 0.75 to 1.0 is provided. In accordance with this, even in a case in which the frequency band of a lowest sound pitch is wide, and a part thereof overlaps with a frequency band of a sound of a second lowest sound pitch, octave musical sound signals Se1 to Se33 in a part overlapping with the second lowest sound pitch are attenuated and extracted while the octave musical sound signals Se1 to Se33 of only the lowest sound pitch are extracted. In accordance with this, the octave musical sound signals Se1 to Se33 composing the lowest sound pitch can be extracted without being missed, and a sense of incongruity of such sounds in the hearing sense can be inhibited to be at a minimum level.

In this way, by setting the passing band, the attenuating band, and the blocking band of the output coefficient C according to the total level ratio D for the output functions 10*g*1 to 10*g*33, a sound of a low sound pitch can be easily extracted among the octave musical sound signals Se1 to Se33.

In addition, although, for the output functions 10*g*1 to 10*g*33 illustrated in FIG. 5, the passing band is set to the range in which the total level ratio D is 0 to 0.75, the attenuating band is set to a range in which the total level ratio D is 0.75 to 1.0, and the blocking band is set to a range in which the total level ratio D is higher than 1.0, the bands are not limited thereto and may be set to arbitrary ranges. The ranges of the total level ratio D in the passing band, the attenuating band, and the blocking band may be changed in accordance with a kind of electric musical instrument (an electric guitar G, a bass guitar, or the like) selected by the changeover switch 6.

Description will be presented with reference back to FIG. 4. By multiplying the output levels of the octave musical sound signals Se1 to Se33 by the output coefficients C1 to C33 acquired from such output functions 10*g*1 to 10*g*33 using the multipliers 10*h*1 to 10*h*33, the output levels of the octave musical sound signals Se1 to Se33 are adjusted. By adding such octave musical sound signals Se1 to Se33 and the musical sound signal Sin input from the ADC 11 using the adder 10*i*, a musical sound signal Sout is generated and is output to the DAC 12.

At this time, as described above, the individual total A0 of “0.0” is acquired by the individual total calculating part 10*e*0, and the total level ratio D1 that is “0.0” acquired by dividing the individual total A0 by the level L1 is input to the output function 10*g*1 by the total level ratio calculating part 10*f*1. In accordance with this, the pass musical sound signal S1 having the lowest sound pitch can be handled as a passing band, and thus, the octave musical sound signal Se1 generated from the pass musical sound signal S1 can be reliably input to the adder 10*i*.

Output levels of octave musical sound signals of which total level ratios D1 to D33 correspond to the passing band or the attenuating band among the octave musical sound signals Se1 to Se33 are maintained or adjusted, and the octave musical sound signals are extracted as musical sound signals input to the adder 10*i*. On the other hand, the output levels of the octave musical sound signals Se2 to Se33 of which total level ratios D1 to D33 correspond to the blocking band become “0”, and thus the octave musical sound signals are blocked from the adder 10*i*.

In accordance with this, octave musical sound signals Se1 to Se33 output to the adder 10*i* are extracted in accordance with the total level ratios D1 to D33, and thus, octave musical sound signals of a low sound pitch can be extracted from the octave musical sound signals Se2 to Se33 based on the musical sound signal Sin and be output to the adder 10*i* without being dependent on a lowest frequency of sounds included in the musical sound signal Sin input from the ADC 11 and a range (width) of frequencies of all the sounds included in the musical sound signal Sin. Here, a musical sound signal Sout output from the effects device 1 will be described with reference to FIGS. 6(*a*) and 6(*b*).

Figure 6A:
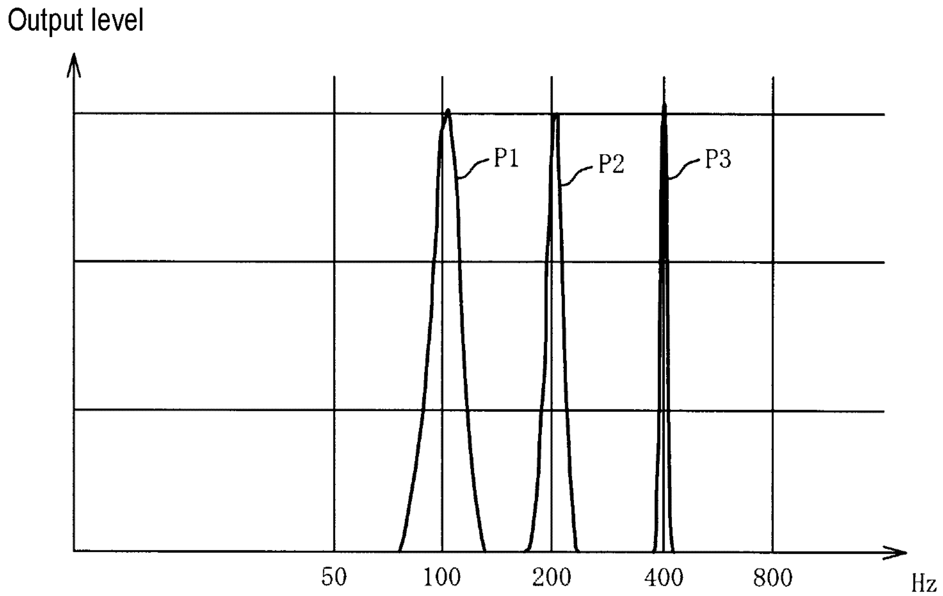
FIG. 6(*a*) is a diagram illustrating a frequency spectrum of a musical sound signal input to the effects device, and FIG. 6(*b*) is a diagram illustrating a frequency spectrum of a musical sound signal output from the effects device.
Figure 6B:
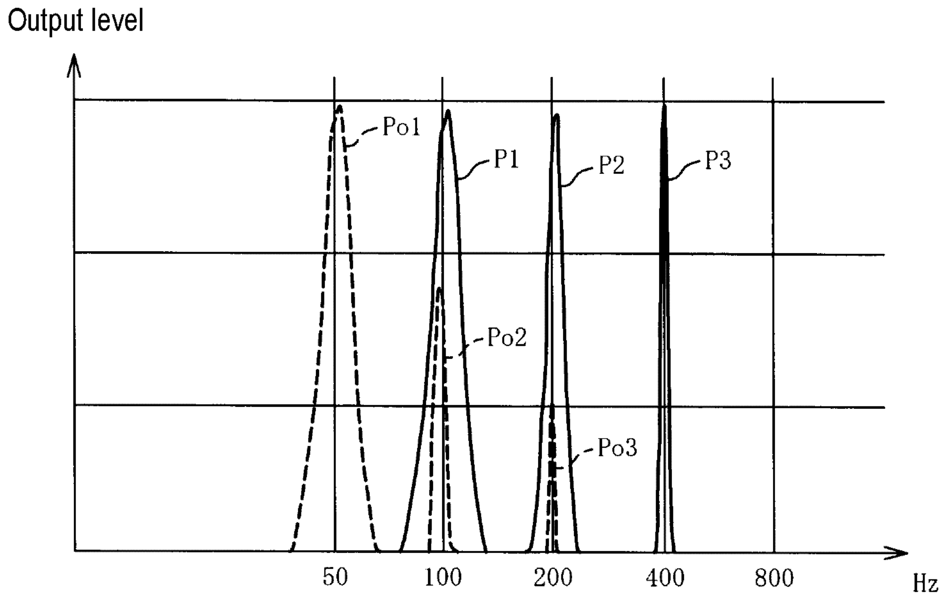

FIG. 6(*a*) is a diagram illustrating a frequency spectrum of a musical sound signal Sin input to the effects device 1, and FIG. 6(*b*) is a diagram illustrating a frequency spectrum of a musical sound signal Sout output from the effects device 1. First, in FIGS. 6(*a*) and 6(*b*), it is assumed that a chord according to sounds of 100 Hz , 200 Hz , and 400 Hz is input as the musical sound signal Sin. In accordance with this, as illustrated in FIG. 6(*a*), as frequency spectrums according to the sounds of the musical sound signal Sin, a spectrum P1 according to the sound of 100 Hz , a spectrum P2 according to the sound of 200 Hz , and a spectrum P3 according to the sound of 400 Hz are output.

In the musical sound signal Sout acquired in a case in which octave processing is performed by inputting such a musical sound signal Sin to the effects device 1, as illustrated in FIG. 6(*b*), in addition to the sounds of the spectrums P1 to P4 according to the musical sound signal Sin, a spectrum Po1 according to a sound acquired by lowering the sound of 100 Hz by one octave, a spectrum Po2 according to a sound acquired by lowering the sound of 200 Hz by one octave, and a spectrum Po3 according to a sound acquired by lowering the sound of 400 Hz by one octave are output.

The sound of 100 Hz that is a sound of a lowest sound pitch included in the musical sound signal Sin corresponds to a passing band, and thus the output level of the sound of 100 Hz that is the origin is output as it is as a sound acquired by lowering the sound of 100 Hz by one octave. In accordance with this, the sound of 100 Hz that is the lowest sound pitch in the musical sound signal Sin is appropriately extracted, and a sound acquired by lowering the sound by one octave can be output.

In addition, the sound of 200 Hz or 400 Hz included in the musical sound signal Sin corresponds to an attenuating band, and thus a sound acquired by lowering the sound of 200 Hz or 400 Hz by one octave is output in a state in which the output level of the sound of 200 Hz or 400 Hz is attenuated.

While the sound acquired by lowering 200 Hz or 400 Hz by one octave (in other words, the spectrum Po2 or Po3 illustrated in FIG. 6(*b*)) is in a frequency band overlapping with the sound of 100 Hz or 200 Hz in the musical sound signal Sin (in other words, the spectrum P1 or P2 illustrated in FIG. 6(*b*)), the output level of the sound acquired by lowering the sound of 200 Hz or 400 Hz by one octave is lower than that of the sound of 100 Hz or 200 Hz in the musical sound signal Sin. In accordance with this, even in a case in which there is a sound of a sound pitch overlapping with a chord included in the musical sound signal Sin and a chord acquired by lowering the musical sound signal Sin by one octave in the musical sound signal Sout, occurrence of blurring and distortion of the sound according to the output musical sound signal Sout can be inhibited to be a minimum level, and thus a sense of incongruity of such a sound in the hearing sense can be inhibited.

As above, while description has been presented on the basis of the embodiment described above, it can be easily conjected that various modifications and alterations can be made.

Figure 7:
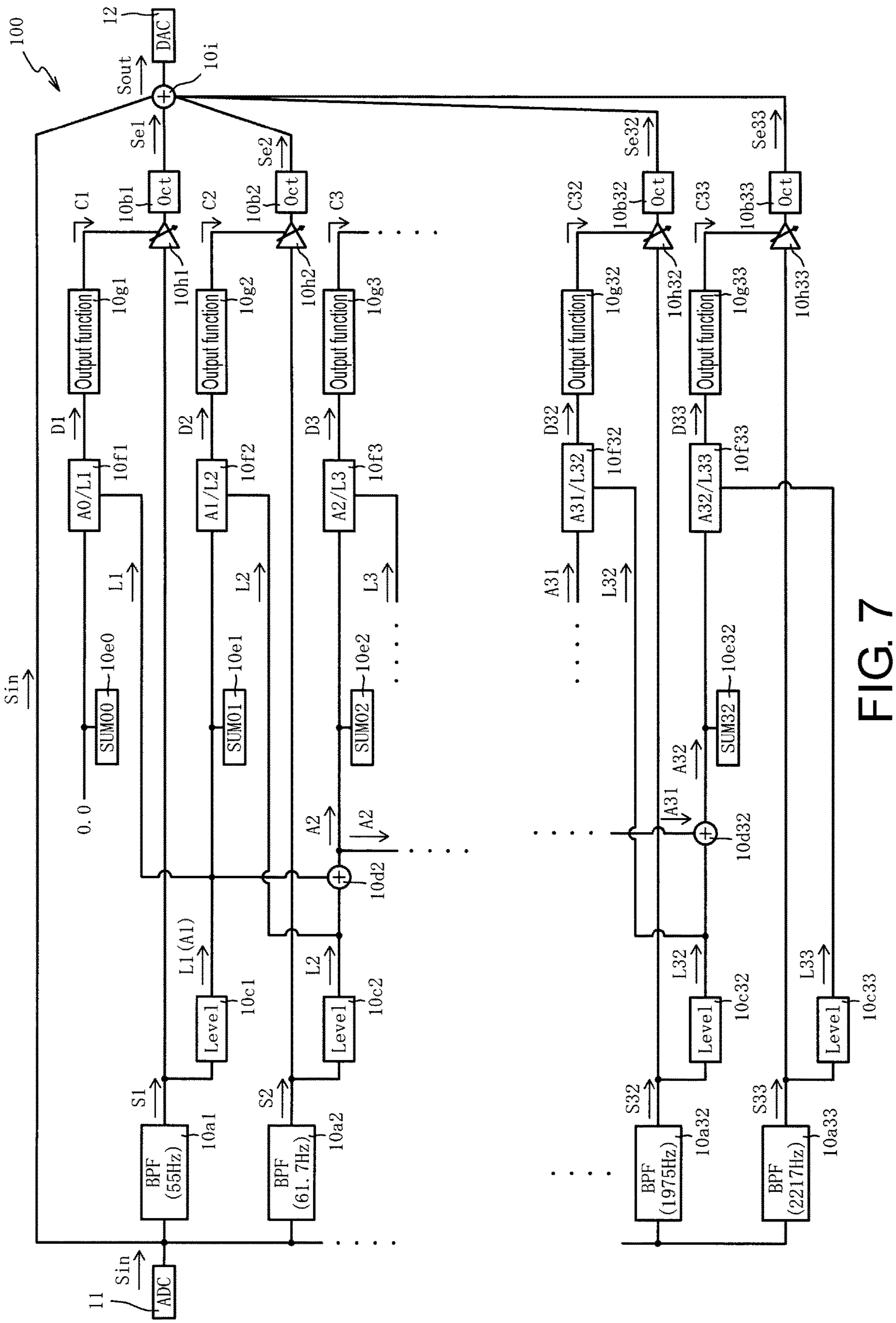
FIG. 7 is a functional block diagram of a DSP according to a modified example.

In the embodiment described above, after the sound pitches of the pass musical sound signals S1 to S33 are lowered by one octave by the octave processing parts 10*b*1 to 10*b*33 illustrated in FIG. 4, output levels thereof are adjusted by multiplying them by the output coefficients C1 to C33, and a musical sound signal Sout is generated by adding the adjusted sound musical sound signals and the musical sound signal Sin using the adder 10*i*. However, the configuration is not limited thereto, and, like a DSP 100 illustrated in FIG. 7, by multiplying the pass musical sound signals S1 to S33 by the output coefficients C1 to C33, after output levels thereof are adjusted, octave musical sound signals Se1 to Se33 acquired by lowering the sound pitches by one octave are generated by the octave processing parts 10*b*1 to 10*b*33, and the generated octave musical sound signals Se1 to Se33 and the musical sound signal Sin are added by the adder 10*i*, whereby a musical sound signal Sout may be generated.

Figure 8:
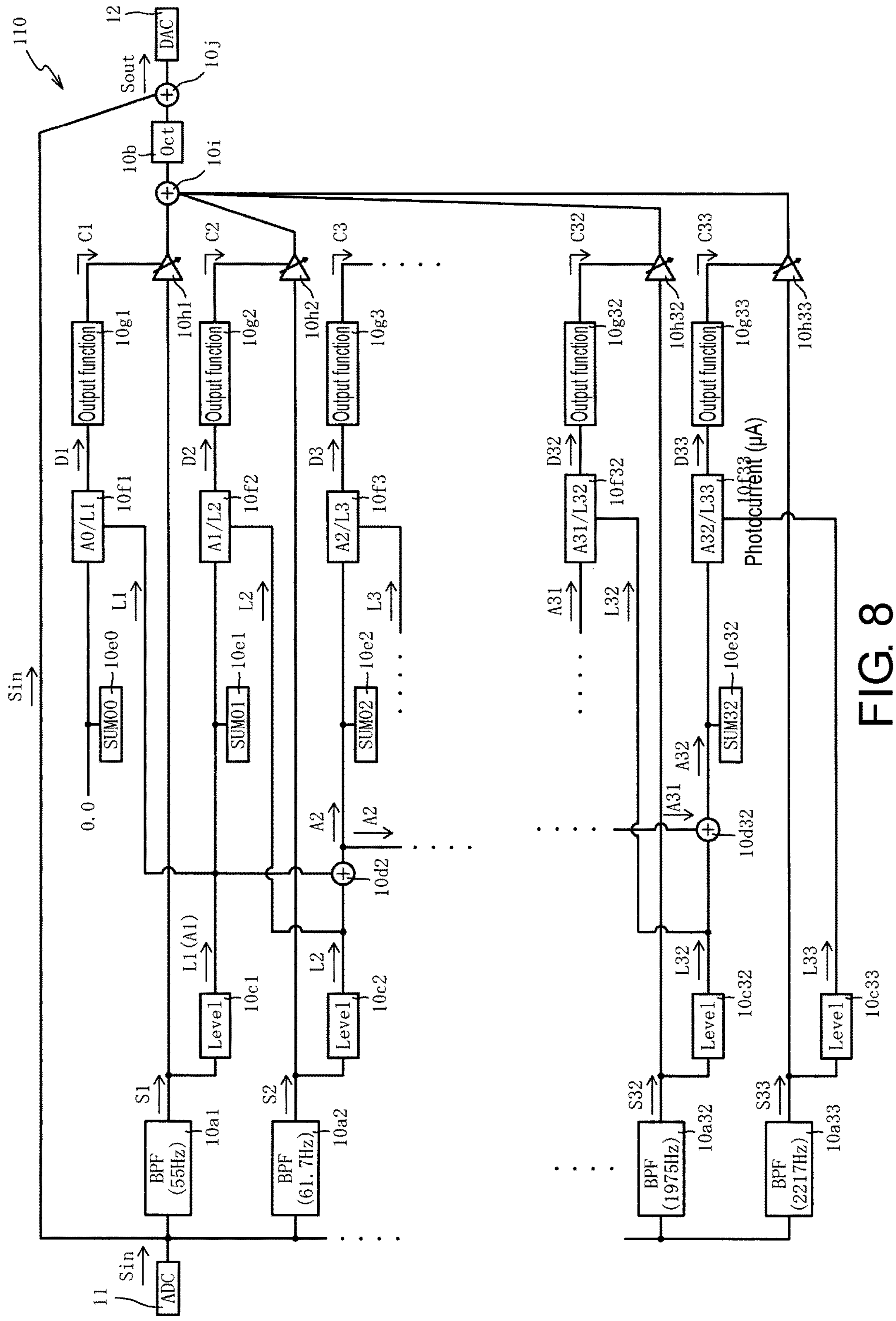
FIG. 8 is a functional block diagram of a DSP according to another modified example.

In addition, like a DSP 110 illustrated in FIG. 8, by multiplying pass musical sound signals S1 to S33 by output coefficients C1 to C33, output levels thereof are adjusted, the adjusted pass musical sound signals S1 to S33 are added by the adder 10*i*, and a musical sound signal acquired by lowering the sound pitch of the added musical sound signal by one octave is generated by the octave processing part 10*b*, and then, the musical sound signals and the musical sound signal Sin input from the ADC 11 are added by the adder 10*j*, whereby a musical sound signal Sout may be generated.

In the embodiment described above, the octave processing (effects processing) of lowering the sound pitch of an input musical sound signal Sin by one octave is performed by the DSP 10. However, the subject that executes the octave processing is not limited to the DSP 10, and the octave processing may be executed by executing an effects processing program (not illustrated) that is a program stored in the ROM 14 (see FIG. 3) using the CPU 13 (see FIG. 3).

Figure 9:
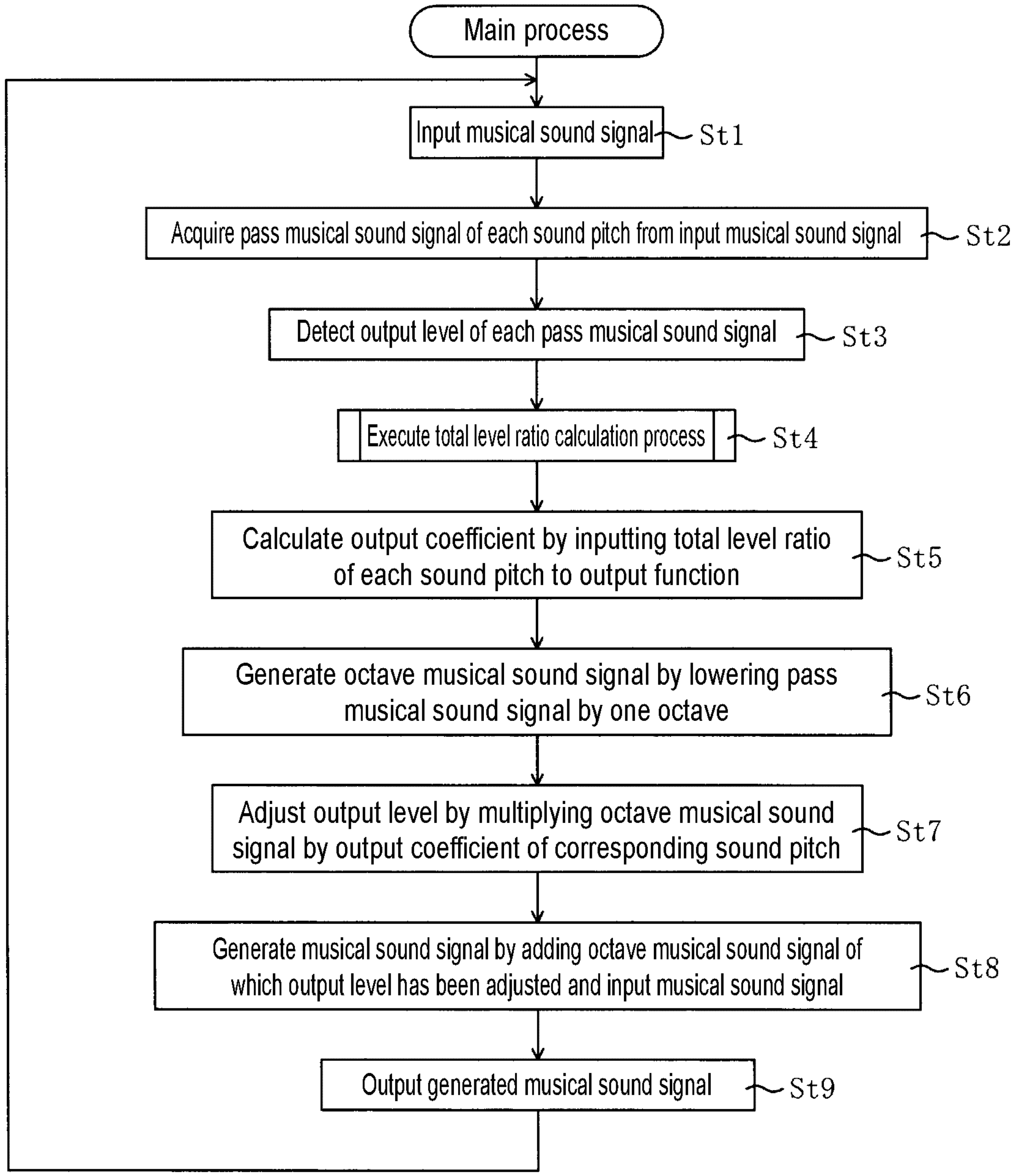
FIG. 9 is a flowchart of a main process according to a modified example.

More specifically, by executing the effects processing program using the CPU 13, a main process illustrated in FIG. 9 is executed. In the main process, first, a musical sound signal Sin is input from the ADC 11 (see FIG. 3) (St1). After the process of St1, pass musical sound signals S1 to S33 that are musical sound signals for each sound pitch are acquired from the input musical sound signal Sin (St2). After the process of St2, levels L1 to L33 that are output levels of the pass musical sound signals S1 to S33 are detected (St3).

After the process of St3, a total level ratio calculation process (St4) is executed. Here, the total level ratio calculation process will be described with reference to FIG. 10.

Figure 10:
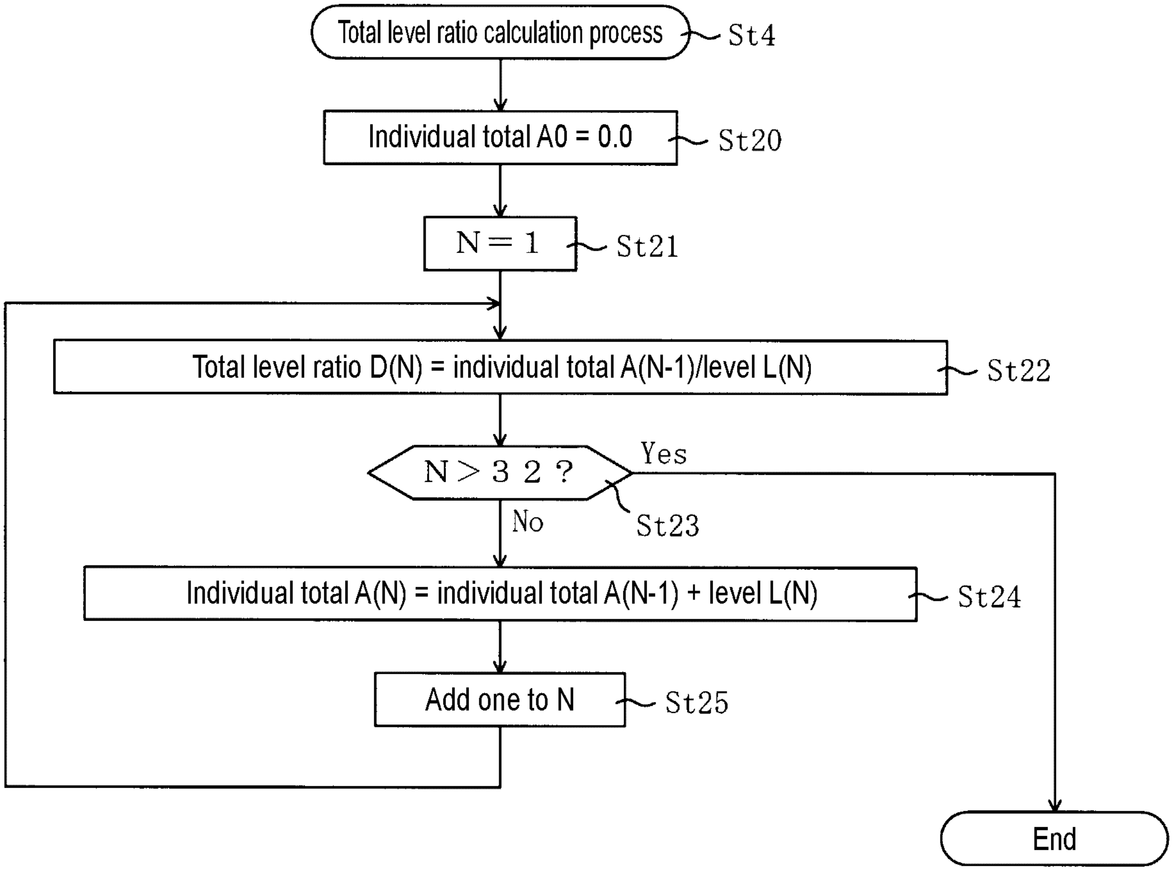
FIG. 10 is a flowchart of a total level ratio calculation process according to a modified example.

FIG. 10 is a flowchart of a total level ratio calculation process according to a modified example. The total level ratio calculation process is a process for calculating total level ratios D1 to D33 that are acquired by dividing individual totals A0 to A32 that are totals of levels L1 to L33 lower than corresponding frequency bands by the corresponding levels L1 to L33 for each of the pass musical sound signals S1 to S33.

In the total level ratio calculation process, first, "0.0" is set to the individual total A0 (St20). As described above with reference to FIG. 4, there is no output level of a frequency band lower than that of the pass musical sound signal S1 for the corresponding individual total A0 in the pass musical sound signal S1, and thus, "0.0" is set to the individual total A0.

After the process of St20, "1" is set to a counter variable N (St21). After the process of St21, a value acquired by dividing an individual total A(N−1) by a level L(N) is set to a total level ratio D(N) (St22). Here, "total level ratio D(N)" represents an N-th total level ratio (D1 to D33) and, for example, in a case in which N is "1", represents "total level ratio D1". "Individual total A(N−1)" represents an (N−1)-th individual total (A0 to A32) and, for example, in a case in which N is "1", represents "individual total A0". In addition, "level L(N)" represents an N-th level (L1 to L33) and, for example, in a case in which N is "1", represents "level L1".

After the process of St22, it is checked whether the counter variable N is larger than 32 (St23). In the process of St23, in a case in which the counter variable N is equal to or smaller than 32 (St23: No), a value acquired by adding the individual total A(N−1) and the level L(N) is set to the individual total A(N) (St24). After the process of St24, "1" is added to the counter variable N (St25), and the processes of St22 and subsequent steps are repeated. On the other hand, in the process of St23, in a case in which the counter variable N is larger than 32 (St23: Yes), the total level ratio calculation process ends.

In other words, the total level ratio D1 corresponding to the pass musical sound signal S1 is set as a value acquired by dividing the individual total A0 that is an individual total of output levels of sound pitches lower than that of the pass musical sound signal S1 by the level L1 corresponding to the pass musical sound signal S1. The total level ratio D2 corresponding to the pass musical sound signal S2 is set as a value acquired by dividing the individual total A1 according to output levels of sound pitches lower than that of the pass musical sound signal S2 by the level L2 corresponding to the pass musical sound signal S2. Thereafter, similarly, values acquired by respectively dividing the individual totals A2 to A32 by the levels L3 to L33 are set to the total level ratios D3 to D33.

Description will be presented with reference back to FIG. 9. After the total level ratio calculation process of St4, by inputting the total level ratios D1 to D33 to the output function (see FIG. 5), output coefficients C1 to C33 according thereto are respectively calculated (St5). After the process of St5, octave musical sound signals Se1 to Se33 that are musical sound signals acquired by lowering the sound pitches of the pass musical sound signals S1 to S33 by one octave are generated (St6). After the process of St6, by multiplying the output levels of the generated octave musical sound signals Se1 to Se33 respectively by the output coefficients C1 to C33, the output levels of the octave musical sound signals Se1 to Se33 are adjusted (St7).

After the process of St7, a musical sound signal Sout that is a musical sound signal acquired by adding the octave musical sound signals Se1 to Se33 of which the output levels have been adjusted and the musical sound signal Sin input in the process of St1 is generated (St8). After the process of St8, the generated musical sound signal Sout is output to the DAC 12 (see FIG. 3) (St9), and the processes of St1 and subsequent steps are repeated.

Such an effects processing program is not limited to being executed by the effects device 1 and may be executed by a computer (an information processing device) such as a PC or a mobile terminal.

In the embodiment described above, the total level ratios D1 to D33 are calculated by dividing the individual totals A0 to A32 respectively by the levels L1 to L33. However, the calculation is not limited thereto, and the total level ratios D1 to D33 may be calculated by dividing the levels L1 to L33 respectively by the individual totals A0 to A32. In such a case, the passing band, the attenuating band, and the blocking band of the output functions 10g1 to 10g33 may be acquired by reversing those illustrated in FIG. 5. For example, a range in which the total level ratios D1 to D33 are "0" to "1.0" may be set as a blocking band, a range in which the total level ratios are "1.0" to "1.33" may be set as an attenuating band, and a range in which the total level ratios are larger than "1.33" may be set as a passing band.

In addition, instead of calculating the total level ratios D1 to D33, total ratios E1 to E33 acquired by dividing the individual totals A0 to A32 by an average value of the levels L1 to L33 may be calculated, and output coefficients C1 to C33 may be output on the basis of such total ratios E1 to E33. In such a case, the output functions 10g1 to 10g33 may be configured such that output coefficients C1 to C33 according to the total ratios E1 to E33 are output. In addition, the total ratios E1 to E33 are not limited to being calculated by dividing the individual totals A0 to A32 by an average value of the levels L1 to L33 and may be calculated by dividing the individual totals A0 to A32 by a maximum value, a minimum value, a median value, or the like of the levels L1 to L33.

In the embodiment described above, although a configuration in which the passing band, the attenuating band, and the blocking band are provided in the output function illustrated in FIG. 5 is employed, the configuration is not limited thereto. For example, the attenuating band may be omitted from the output function, or the passing band may be omitted. In addition, the output function may be configured only by an attenuating band in the entire area of the total level ratio D.

In the embodiment described above, the octave processing has been described as an example of a sound effect added to the input musical sound signal Sin. However, the added sound effect is not limited to the octave processing and may be another sound effect such as distortion and delay, reverberation, or the like. In addition, by outputting only a sound of a lowest sound pitch included in the input musical sound signal Sin, a root sound in the case of playing a chord may be configured to be acquired (detected).

Numerical values represented in the embodiment described above are examples, and, naturally, other numerical values can be employed.

It will be apparent to those skilled in the art that various modifications and variations can be made to the disclosed embodiments without departing from the scope or spirit of the disclosure. In view of the foregoing, it is intended that the disclosure covers modifications and variations provided that they fall within the scope of the following claims and their equivalents.

What is claimed is:

1. An effects device connected to a guitar with a plurality of strings comprising:
a digital signal processor; and
an analog digital converter connected to the digital signal processor, wherein the digital signal processor configured to:
input a musical sound signal of the strings of the guitar generated by guitar playing converted by the analog digital converter;
detect a level of the musical sound signal input by the digital signal processor for each of multiple frequency bands;
extract a frequency characteristic of the musical sound signal based on the level of the musical sound signal detected by the digital signal processor;
add a predetermined sound effect only to a lowest frequency band of the musical sound signal based on the frequency characteristic of the musical sound signal extracted by the digital signal processor; and
calculate, for each multiple frequency bands, a total of the level, which are detected by the digital signal processor, of frequency bands lower than the frequency band,
wherein the digital signal processor is configured to extract a frequency characteristic of the musical sound signal according to a frequency band for which the total is smaller than a predetermined value among the totals for each frequency band calculated by the digital signal processor based on the level of the musical sound signal detected by the digital signal processor.

2. The effects device according to claim 1, wherein the predetermined sound effect is an octave processing.

3. The effects device according to claim 1, wherein the frequency band is set for each sound pitch.

4. The effects device according to claim 3, wherein the frequency band set for each sound pitch is a pass band set in correspondence with a frequency that is one semitone before a center frequency that is center of the frequency for each sound pitch and a frequency that is one semitone after the center frequency.

5. The effects device according to claim 1, wherein the predetermined sound effect added by the digital signal processor is conversion of the musical sound signal extracted by the digital signal processor into a musical sound signal of a sound pitch that is lower than a sound pitch of the extracted musical sound signal by one octave.

6. The effects device according to claim 1, wherein the digital signal processor is further configured to calculate a total level ratio that is a ratio between the total for each frequency band calculated by the digital signal processor and the level of the corresponding frequency band detected by the digital signal processor,
wherein the digital signal processor extracts the musical sound signal of a low sound in the musical sound signal input by the digital signal processor from among the musical sound signals for the frequency bands in accordance with the total level ratio for each frequency band calculated by the digital signal processor.

7. The effects device according to claim 6, wherein the digital signal processor extracts the musical sound signal input by the digital signal processor regardless of a musical sound of a high sound in the musical sound signal input by the digital signal processor.

8. The effects device according to claim 7, further comprising a digital signal processor configured to select a musical instrument that outputs the musical sound signal input by the digital signal processor, wherein the first predetermined ratio and/or the second predetermined ratio are changed in accordance with the musical instrument selected by the digital signal processor.

9. The effects device according to claim 6, wherein the digital signal processor calculates the total level ratio by dividing the total for each frequency band calculated by the digital signal processor by the level of the corresponding frequency band detected by the digital signal processor, and wherein the digital signal processor extracts the musical sound signal of a low sound in the musical sound signal input by the digital signal processor by extracting a musical sound signal of a frequency band for which the total level ratio calculated by the digital signal processor is equal to or lower than a predetermined value from among the musical sound signals for the frequency bands.

10. The effects device according to claim 9, wherein the digital signal processor is further configured to adjust a level of a musical sound signal by applying an output coefficient, which is a coefficient for increasing the level of the musical sound signal as the total level ratio of a corresponding frequency band calculated by the digital signal processor becomes smaller, to the musical sound signal for each frequency band, wherein the digital signal processor extracts the musical sound signal of a low sound in the musical sound signal input by the digital signal processor by adding together musical sound signals of all the frequency bands of which the levels are adjusted by the digital signal processor.

11. The effects device according to claim 10, wherein, as the output coefficient, a coefficient for maintaining the level of the musical sound signal is set in a case in which the total level ratio is lower than a first predetermined ratio, a coefficient for blocking the musical sound signal is set in a case in which the total level ratio is higher than a second predetermined ratio, and a coefficient for lowering the level of the musical sound signal as the total level ratio becomes larger is set in a case in which the total level ratio is between the first predetermined ratio and the second predetermined ratio.

12. The effects device according to claim 1, wherein the digital signal processor is further configured to calculate a total ratio that is a ratio between the total for each frequency band calculated by the digital signal processor and an average value, a maximum value, a minimum value, or a median value of all the levels of the corresponding frequency band detected by the digital signal processor, wherein the digital signal processor extracts the musical sound signal of the low sound in the musical sound signal input by digital signal processor from among the musical sound signals of the frequency bands in accordance with the total ratio for each frequency band calculated by the digital signal processor.

13. An effects processing method comprising:

inputting a musical sound signal of a guitar converted by an analog digital converter;

detecting a frequency characteristic of the musical sound signal of the guitar by a digital signal processor;

conducting an octave processing, only for frequency band corresponding to a lowest string among a plurality of strings of the guitar, to the musical sound signal of the guitar, based on the detecting of the frequency characteristic by the digital signal processor, and calculating, for each multiple frequency bands, a total of the level, which are detected by the digital signal processor, of frequency bands lower than the frequency band, wherein the digital signal processor is configured to extract a frequency characteristic of the musical sound signal according to a frequency band for which the total is smaller than a predetermined value among the totals for each frequency band calculated by the digital signal processor based on the level of the musical sound signal detected by the digital signal processor.

14. An effects processing method comprising:

inputting a musical sound signal of strings of a guitar generated by guitar playing converted by an analog digital converter;

detecting a level of the musical sound signal input in the inputting of a musical sound signal for each of multiple frequency bands by a digital signal processor;

extracting a frequency characteristic of the musical sound signal based on the level of the musical sound signal detected in the detecting of a level of the musical sound signal by the digital signal processor; and adding a predetermined sound effect only to a lowest frequency band of the musical sound signal based on the frequency characteristic extracted in the extracting of a musical sound signal by the digital signal processor; and calculating, for each multiple frequency band, a total of the level, which is detected in the detecting of the level of the musical sound signal, of frequency bands lower than the frequency band, wherein, in the extracting of a frequency characteristic, the frequency characteristic of the musical sound signal is extracted according to a frequency band for which the total is smaller than a predetermined value among the totals for each frequency band calculated in calculating of an total based on the level of the musical sound signal detected in detecting a level of the musical sound signal.

15. The effects processing method according to claim 14, further comprising calculating a total level ratio that is a ratio between the total for each frequency band calculated in the calculating of an total and the level of the corresponding frequency band detected in the detecting of a level, wherein, in the extracting of a musical sound signal, the musical sound signal of a low sound in the musical sound signal input in the inputting of a musical sound signal is extracted from among the musical sound signals for the frequency bands in accordance with the total level ratio for each frequency band calculated in the calculating of a total level ratio.

16. The effects processing method according to claim 15, further comprising adjusting a level of a musical sound signal by applying an output coefficient, which is a coefficient for further increasing the level of the musical sound signal as the total level ratio of a corresponding frequency band calculated in the calculating of a total level ratio becomes smaller, to the musical sound signal for each frequency band, wherein, in the extracting of a musical sound signal, the musical sound signal of the low sound in the musical sound signal input in the inputting of a musical sound signal is extracted by adding musical sound signals of all the frequency bands of which the levels are adjusted in the adjusting of a level, the output coefficient is changed in accordance with a musical instrument selected in a selecting of the musical instrument.

17. The effects processing method according to claim 15, further comprising selecting a musical instrument that outputs the musical sound signal input in the inputting of a musical sound signal, wherein an output coefficient is changed in accordance with the musical instrument selected in the selecting of a musical instrument.

18. The effects processing method according to claim 14, further comprising calculating a total ratio that is a ratio between the total for each frequency band calculated in the calculating of an total and an average value, a maximum value, a minimum value, or a median value of all the levels of the corresponding frequency band detected in the detecting of a level, wherein, in the extracting of a musical sound signal, the musical sound signal of the low sound in the musical sound signal input in the inputting of a musical sound signal is extracted among the musical sound signals of the frequency bands in accordance with the total ratio for each frequency band calculated in the calculating of a total ratio.

* * * * *